United States Patent
Atkins et al.

(10) Patent No.: US 6,240,422 B1
(45) Date of Patent: May 29, 2001

(54) OBJECT TO RELATIONAL DATABASE MAPPING INFRASTRUCTURE IN A CUSTOMER CARE AND BILLING SYSTEM

(75) Inventors: Stephan Atkins, Frankfurt; Andreas Hohmann, Düsseldorf; James Baldwin, Düsseldorf; Frank Schmetz, Düsseldorf, all of (DE)

(73) Assignee: American Management Systems, Inc., Fairfax, VA (US)

( * ) Notice: Subject to any disclaimer, the term of this patent is extended or adjusted under 35 U.S.C. 154(b) by 0 days.

(21) Appl. No.: 09/353,591

(22) Filed: Jul. 15, 1999

Related U.S. Application Data

(60) Provisional application No. 60/094,459, filed on Jul. 29, 1998.

(51) Int. Cl.[7] .................................................. G06F 17/30
(52) U.S. Cl. .......................... 707/102; 707/100; 707/101; 707/103; 707/501; 707/511; 709/315; 709/316; 345/433
(58) Field of Search ..................................... 707/3–5, 100, 707/102, 103, 101, 201, 204; 709/224, 225, 315, 316; 705/5; 711/118; 345/433, 348; 717/2

(56) References Cited

U.S. PATENT DOCUMENTS

| | | | | |
|---|---|---|---|---|
| 5,291,583 | * | 3/1994 | Bapat | 707/100 |
| 5,295,256 | * | 3/1994 | Bapat | 707/100 |
| 5,426,780 | * | 6/1995 | Gerull et al. | 707/3 |
| 5,448,727 | * | 9/1995 | Annevelink | 707/103 |
| 5,504,885 | * | 4/1996 | Alashqur | 707/103 |
| 5,729,739 | * | 3/1998 | Cantin et al. | 707/103 |
| 5,809,505 | * | 9/1998 | Lo et al. | 707/102 |
| 5,873,093 | * | 2/1999 | Williamson et al. | 707/103 |
| 5,937,409 | * | 8/1999 | Wetherbee | 707/103 |
| 6,038,566 | * | 3/2000 | Tsai | 707/102 |
| 6,108,664 | * | 8/2000 | Nori et al. | 707/103 |
| 6,154,748 | * | 11/2000 | Gupta et al. | 707/102 |

OTHER PUBLICATIONS

Fu, Mei–Mei et al., "A Concurrent Programming Environment for Memory–Mapped Persistent Object Systems," Proceedings of the Seventeenth Annual International Conference on Computer Software and Applications, 1993, COMPSAC '93., Nov. 1–5, 1993, pp. 291–329.*

Millard, Bruce et al., "Run–Time Support and Storage Management for Memory–Mapped Persistent Objects," Proceedings of the 13th International Conference on Distributed Computing Systems, May 25–28, 1993, pp. 508–515.*

International Search Report, International Appl. No. PCT/US99/16765, International Filing Date Jul. 26, 1999, 4 pgs.

Charly Kleissner, "Enterprise Objects™ Framework A Second Generation Object–Relational Enabler", Association of Computing Machinery, 1995, pp. 445–459.

Bryan Boreham, "What's My Line?", Effective C++, XP–000856296, Application Development Advisor, 1998, pp. 66, 68–69.

Rene Brun et al., "ROOT–An object oriented data analysis framework", Nucleatr Instruments and Methods in Physics Research, 1997, pp. 81–86.

* cited by examiner

Primary Examiner—Hosain T. Alam
Assistant Examiner—Shahid Alam

(57) ABSTRACT

A system that uses an object to relational database mapping infrastructure to map C++ objects and their relationships to and from a relational database. The mapping is facilitated by mapping files which describe an object and how the object corresponds to a table in the database. Overflow tables are provided in the database when an object is associated with more than a predetermined number of other objects, such as two. A C++ reflection layer allows access to attributes and methods of C++ objects at run-time by name. Mapped data is also memory buffered during the transferring of data to and from the database.

10 Claims, 7 Drawing Sheets

FIG. 4A

CustomerTable.inf

```
01 TableName = "CUSTOMER"
02 BufferSize = 10
03
04 MapFileName = "ResidentialCustomer.map" and
05 MapFileName = "BusinessCustomer.map"
```

FIG. 4B

ResidentialCustomer.map

```
01 ParentMapFileName = "Customer.map"
02
03 "LastName"              : string    <-> ("LAST_NAME", 20, Null)
```

FIG. 4C

BusinessCustomer.map

```
01 ParentMapFileName = "Customer.map"
02
03 "CompanyName"           : string    <-> ("COMPANY_NAME", 20, Null)
```

FIG. 4D

Customer.map

```
01 "CustomerID"            : int       <-> ("CUSTOMER_ID", 10, NotNull)
02   links "ACCOUNT_OVERFLOW"."CUSTOMER_ID"
03 "Address" contains
04   "mstrStreet"          : string    <-> ("STREET", 30, NotNull)
05 end
06 "AccountList"           : uses Key  ("ACCOUNT_ENTRIES", 4, NotNull)
07   OverflowMapFileName = "AccountOverflowTable.inf"
08   FixedEntries =
09     Class Account contains
10       "AccountID"       : int       <-> ("ACCOUNT_ID_1", 10)
11     end
12     class Account contains
13       "AccountID"       : int       <-> ("ACCOUNT_ID_2", 10)
14     end
```

FIG. 4E

AccountOverflowTable.inf

```
01 TableName = "ACCOUNT_OVERFLOW"
02 BufferSize = 10
03
04 MapFileName = "Account.map"
```

FIG. 4F

Account.map

```
01 "AccountID"             : int       <-> ("ACCOUNT_ID", 10, NotNull)
```

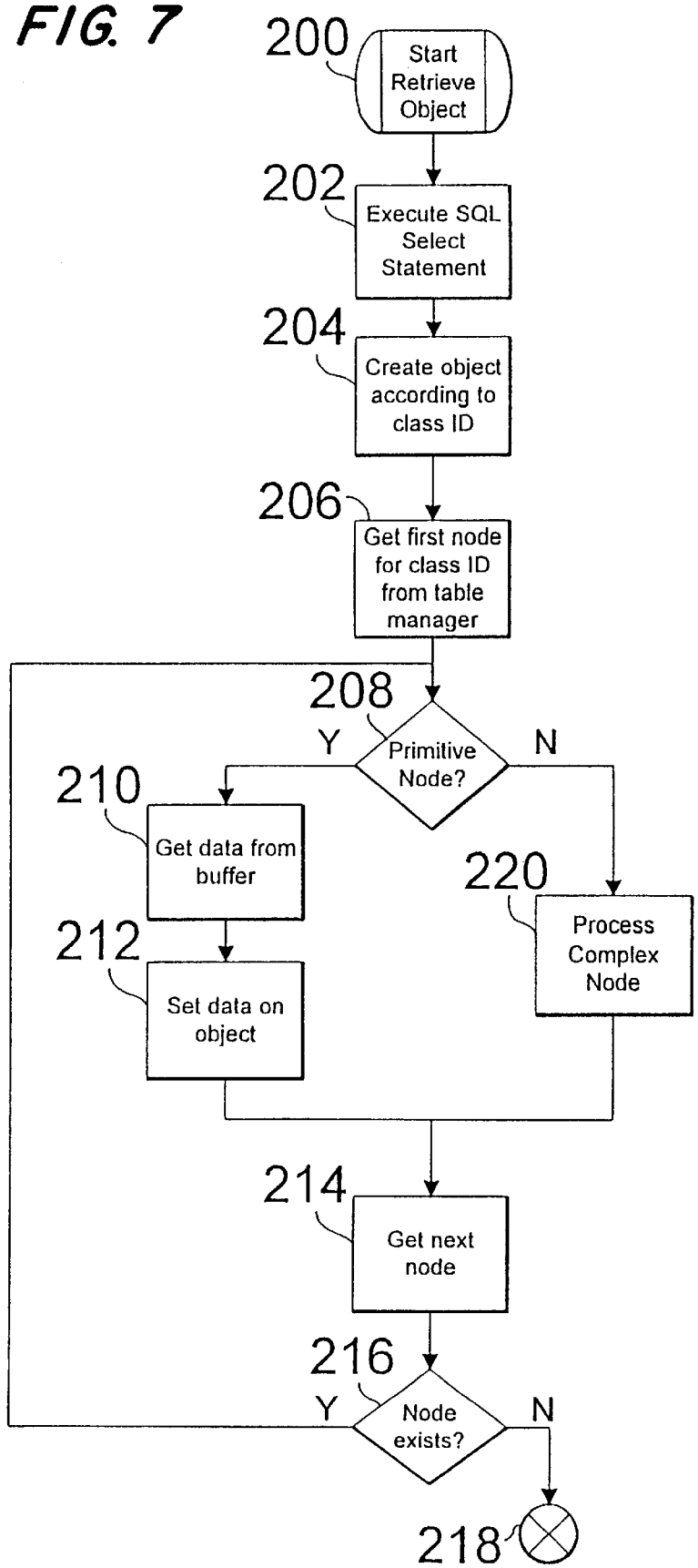

OBJECT TO RELATIONAL DATABASE MAPPING INFRASTRUCTURE IN A CUSTOMER CARE AND BILLING SYSTEM

CROSS REFERENCE TO RELATED APPLICATION

This application is related to and claims priority to U.S. provisional application serial number 60/094,459, filed Jul. 29, 1998, entitled Component Based-Object Oriented Convergent Customer Care And Billing System by Hohmann et. al. and which is incorporated herein by reference.

BACKGROUND OF THE INVENTION

1. Field of the Invention

The present invention is directed to a system for mapping objects and their associations to and from a relational database and, more particularly, to a system that uses a reflection layer, mapping files, overflow tables and buffered database input/output to provide flexibility and performance improvements in high volume transaction situations.

2. Description of the Related Art

A recurring problem in object development is how to insert or retrieve an object from a relational database table without hard-coding the object's structure and the database function calls. Objects can contain basic types as attributes (for example dates, strings, etc.) which map directly to the database, but they can also contain other objects, pointers to objects and lists, which may need mapping to multiple tables. Complex inheritance structures complicate the mapping issues. Hard-coding a solution, as seen in many systems, results in difficult to maintain and unwieldy database interfaces. What is needed is an object to relational database mapping infrastructure.

Another problem is how to store objects that are contained within lists in a parent object. A possible approach is to store the list object in a separate table and associated to the parent object using foreign key relationship. This approach does not provide the performance necessary for high volume data processing since for each object containing an object list, a second table needs to be accessed. Another possible approach is to store the list objects within the parent object's storage table. This results in having to provide columns to store all possible entries. This results in large storage tables within many of the columns remaining empty when the lists are not full. What is needed is a system which will allow storage of an optimum number of list entries within the parent object's table. The optimum number has to be determined on a case by case basis and solely depends on the business scenario. For example, a scenario where 96% of all customers of a telecommunication company are estimated to have one or two accounts, the remaining 4% have an average of 6 accounts. In this scenario, two might be the optimal number to provide fast access for 96% of the customer retrievals and not to allocate storage for more accounts that are not used by 96% of the customers in the database.

SUMMARY OF THE INVENTION

It is an object of the present invention to provide a system that maps objects and their associations to and from a relational database.

It is another object of the present invention to provide mapping files that allow configuration of all object attributes and methods at run time.

It is also an object of the present invention to provide an overflow mechanism used to enhance the speed of access.

It is also an object of the present invention to buffer data between the objects and the database to improve efficiency.

It is also an object of the present invention to utilize a reflection layer to interact with the business objects.

The above objects can be attained by a system that uses an infrastructure to map objects and their associations to and from a relational database. The mapping is facilitated by metadata or scripts in the form of mapping files which describe how an object corresponds to a table in the database. To facilitate speed and efficiency overflow tables are provided in the database when an object is associated with more than a predetermined number of other objects. A reflection layer is provided that allows particular attributes and methods of the objects to be resolved at run time. Mapped data is also buffered during the operation of transferring data to and from the database.

These together with other objects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 4A–4F shows example mapping files.

FIG. 7 depicts a process of mapping from a database to an object.

DESCRIPTION OF THE PREFERRED EMBODIMENTS

Figure 1:
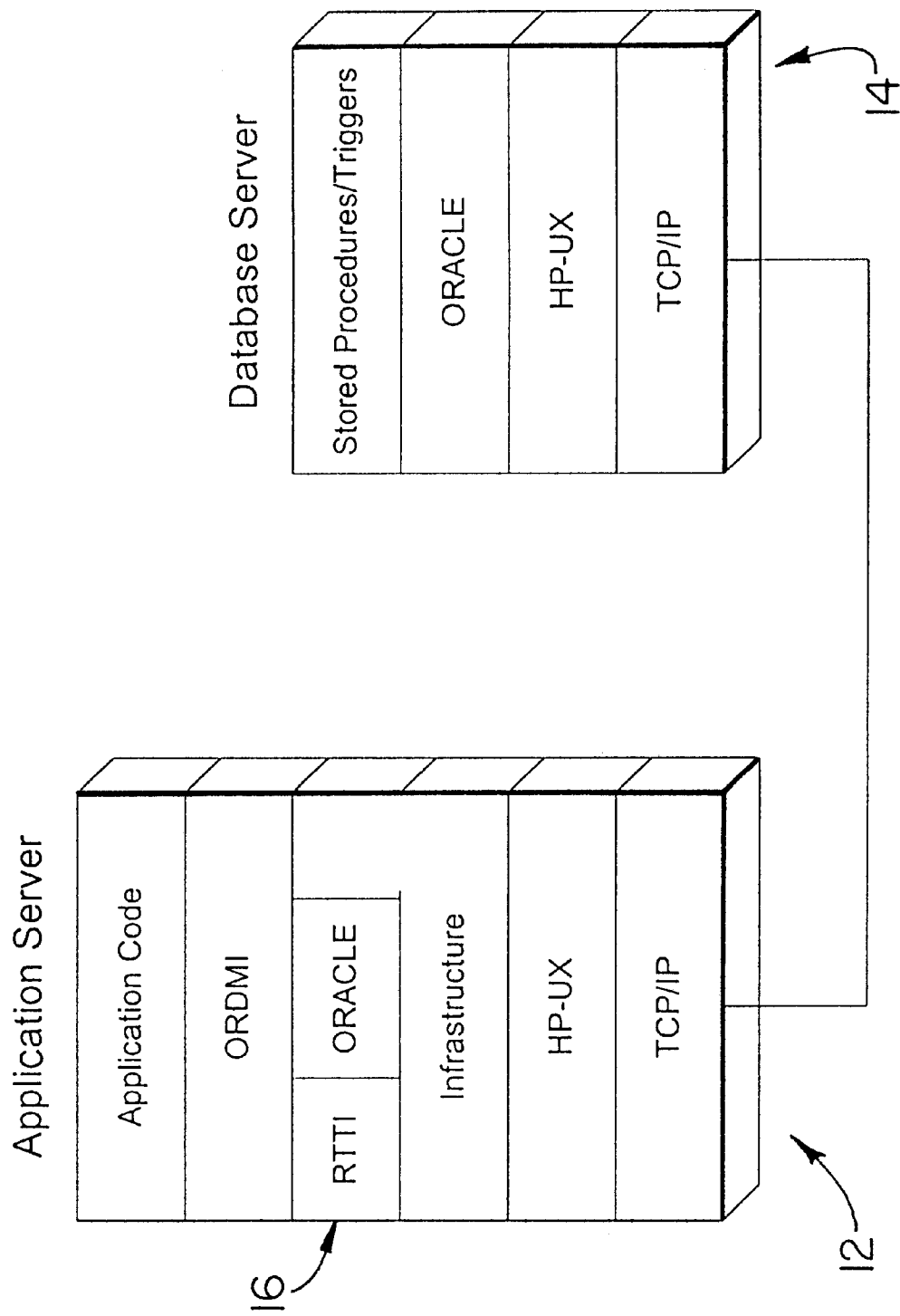
FIG. 1 depicts a hardware and software architecture of the present invention.

The present invention, an Object to Relational Database Mapping Infrastructure In A Customer Care And Billing System ("ORDMI"), provides an infrastructure to facilitate mapping of objects to and from relational database tables. The invention provides a combination of a C++ reflection layer, a mapping mechanism that is configured by metafiles, the use overflow tables and buffered database input-output (IO). This combination provides the flexibility and performance necessary for high volume transactions.

The ORDMI can insert or retrieve objects from a relational database table where the class to which the object belongs is not known until run time. ORDMI allows changes to the actual mapping at run-time. This provides the flexibility to adjust to new or modified classes, to new or modified associations and to new or modified database tables. Furthermore, it achieves this flexibility for high volume transactions by utilizing overflow tables and IO buffering to reduce the database load.

The ORDMI uses mapping files that describe how objects are mapped to and/or from relational database tables. The mapping files are read and interpreted at initialization time. No mapping information is hard coded in the application code. The information in the mapping files is used to initialize utility objects and buffers used for the database IO process. When an object is mapped to and/or from a buffer area, the infrastructure framework utilizes a C++ reflection layer to access the object's attributes. All database IO operations performed are buffered in memory to gain additional performance enhancements. The size of the buffer area can be configured for each table separately. The optimal size of the buffer area is solely dependent on the business scenario the application is used for. The size of the buffer area can be configured in the mapping files (see also FIG. 4A, line 02), independent for each database table.

The ORDMI also allows storage of the optimum number of list entries within the parents object's table. Any extra entries, referred to as overflow objects, are stored in a secondary table designed for that list object. These tables are called overflow tables. After an overflow object has been inserted, the object needs to be related back to the parent object and vice-versa. For this reason, a unique identifier of the parent object is added to the overflow object when it is stored in the overflow table to establish a foreign key relationship. The parent object's storage table also contains an entry count field for every list. This count makes it possible to speed up performance on retrieval of the parent object, as it can be checked to see if the overflow table needs to be accessed to retrieve any overflow objects and return them to the calling process. Other additional fields are used for object references to indicate if the reference is valid and to indicate the class ID if more that one class is stored in one table. Overflow tables typically are small because overflow objects should be the exception, otherwise the optimum entry count for the main event storage table needs to be adjusted.

Before providing a more detailed description of the invention a summary of some of the terms used herein will be provided. Class is a program module that combines logic and state. An Object is a specific instance of a class. An attribute is part of an object's state. A method is part of a class or object and performs operations. Methods can be called by other objects or by the object itself. A Reflection Layer or Run-Time Type Information (RTTI) provides a mechanism to browse objects at run-time for their type, attributes and methods. This facilitates late binding where it is determined at run-time what operations are executed. Persistent Storage is storage residing on a persistent medium, usually a database or file. A Primary Key is a data element(s) used to identify a persistent entity in persistent storage. A Persistent Object is an object where the state can be stored and retrieved from a persistent storage.

The ORDMI is preferably implemented using C++ running on a HP-UNIX application server platform 12, as depicted in FIG. 1. The system uses an Oracle database system in a database server 14 to store persistent objects. The ORDMI uses a C++ reflection layer (RTTI) 16 to access the objects' attributes and the Oracle Call Interface (OCI) to access the database.

The reflection layer 16 allows for access to attributes and methods of C++ objects by name as required by the scripting layer or mapping files. A reflection layer is a conventional mechanism for changing structure and behavior of software systems dynamically. The reflection layer provides information and access to system properties and makes the software self-aware. Programming languages, such as JAVA, contain reflection layers as a feature of the language itself. Implementation of reflection layers is described in A SYSTEM OF PATTERNS, by Frank Buschman et. al., Wiley and Sons, ISBN 0 471 95869 7, incorporated by reference herein.

The ORDMI uses a series of mapping files (see FIGS. 4A–4F for an example) to describe an object and how the object corresponds to a specific table(s) within the database. An information file (see FIG. 4A for an example) exists for each database table listing all mapping files applicable for the database table. This provides the ability to store multiple classes in the same table. Each mapping file (see FIG. 4B for example) lists a parent mapping file and describes the mapping of the object's attributes and related objects. The parent mapping file is used to include the parent's class attribute mapping for a derived class. Each class can contain basic attributes, other objects, pointers to objects and lists of objects. Examples of these files will be discussed later herein.

On initialization the system reads and parses the mapping information for each table that is used in processing. When the mapping files are parsed, a tree of node objects is created in memory (see FIG. 5 for an example) When the mapping information is read a MappingInformation object is created that contains references to the tree root node objects. The MappingInformation object is used to create the TableManager object. Each tree represents the mapping structure for a particular class. The mapping information for a particular table can contain multiple trees if multiple classes are stored in the same table. To support inheritance, a tree can be a subsection of another tree. An example for this are two subclasses where both mapping trees refer to the parent class mapping tree to include the mapping for the inherited attributes. Each node in turn represents the mapping information of a primitive attribute (numeric, string, date) or complex data structure (object, list). The tree is used at run-time to map the object to and from the database. Each node in the tree can refer to a child node that is to be processed next after the node has been processed. Nodes representing complex data structures refer to sub-nodes to break down the complex structure to primitive attributes. During initialization, for each node representing a primitive attribute, a related database field object is created. The infrastructure provides a class named CdoDbField to provide the functionality required for database filed objects. The database field object corresponds directly to a database column and refers to the buffer area for the particular database column. This buffer is created during initialization phase for each database field object created. The mapping process traverses the tree and for each node representing a primitive attribute, the mapping for the particular attribute is performed by the node and associated database field object. The nodes provide the functionality or methods needed to extract data from the object or to set data on the object. The database field objects provide the functionality to get data from the buffer or to put data into the buffer. For complex nodes, the traversing algorithm recursively processes the sub-nodes before advancing to the next child node. The TableManager object provides an interface to read and write objects from and to the table. When the TableManager object is initialized it is provided with a MappingInformation object containing the mapping information.

The following node types are used: Primitive Nodes, Object Nodes, Pointer Nodes, List Nodes and Key Nodes.

Figure 5:
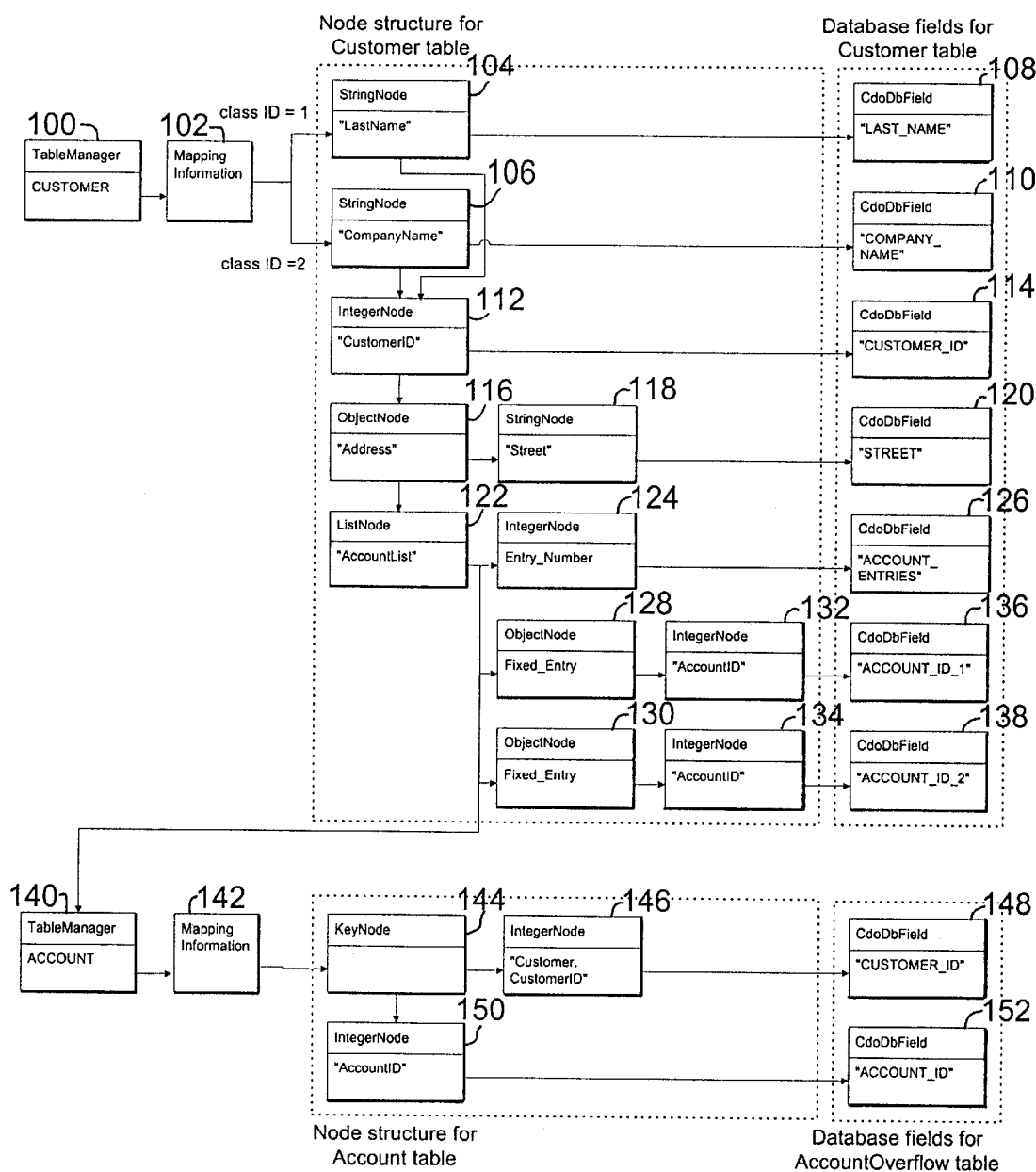
FIG. 5 depicts a node structure.

Primitive Nodes represent low-level types of attributes (such as numerics, dates or strings) that can be mapped directly to a database column (see 104 of FIG. 5 for an example). The primitive nodes provide the link to the database table layout. For each Primitive Node a DBField object is created that provides the buffering for each database column.

Object Nodes represent objects related to the class described in the mapping file (see 116 of FIG. 5 for an example). The related class can either be contained in the same table or be described in a separate mapping file and be mapped into a different table.

Pointer Nodes are used for optional zero to one relationships (pointer nodes are not included in the example since they function very similar to object nodes). The related class can either be contained in the same table or be described in a separate mapping file and be mapped into a different table. For pointer relationships an additional database column is used to indicate whether the pointer is NULL. If the related object can be of different classes, an additional database column containing the class identifier is used. This provides ORDMI with the ability to handle different classes of objects at run-time.

List Nodes represent a list of objects contained in the class described in the mapping file (see 122 of FIG. 5 for an example). For performance reasons, all objects in the list up to a determined number are stored within the table of the class containing the list. The remaining objects in the list are considered overflow objects and are stored in a separate table. For a list node, a second mapping file is provided that is used to map the overflow objects.

Key Nodes are used for foreign-key relationships and refer to the attribute used as the foreign-key (see 144 of FIG. 5 for an example).

The node concept provides ORDMI with the ability to handle arbitrary complexity and nesting. For example, ORDMI can handle lists within lists (i.e. overflows within overflows), lists of pointers to an abstract base, pointers to objects containing lists or pointers to other objects, etc.

When an object has to be mapped to the database layout, the object is passed to the root node of the tree representing the mapping information for the corresponding class. Each primitive node in the tree then extracts the data from the object, using the reflection layer, into a database buffer in memory. This process is a collaboration of the Primitive Node object extracting the attribute from the object and the field object copying the attribute to the buffer area. The buffer is then written to the database if it is full. The buffer size is defined in the mapping file (see FIG. 4A, line 02). The array insert function provided by OCI is used to transfer the data efficiently to the database.

When an object is read from the database, the row of data is retrieved and copied to the buffer area. Then, an empty object with the corresponding class ID is created. The empty object is then passed to the root node of the tree representing the mapping information for the corresponding class. Each primitive node gets the data from the buffer the field is linked to and uses the reflection layer to copy the value to the object's attribute. This process is a collaboration of the field object getting the attribute from the buffer area and the Primitive Node object setting the attribute on the object. Additional objects are created for list nodes or Pointer Nodes where necessary.

Figure 2:
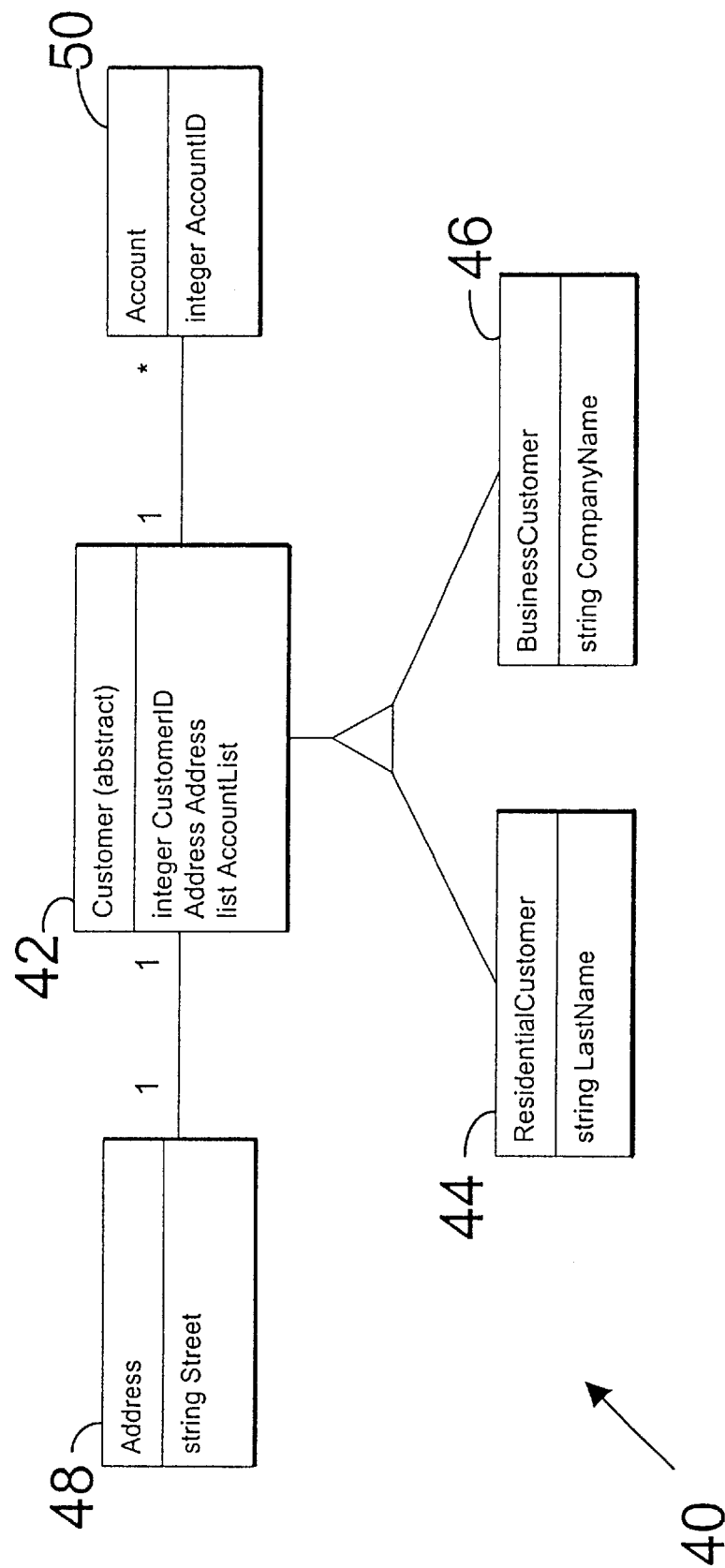
FIG. 2 depicts an example object model.

To demonstrate the use of the ORDMI infrastructure a simple example scenario will be discussed. This scenario consists of five classes of which four are being stored in the relational database. An object model 40, as shown in FIG. 2, depicts the classes, the class attributes and the class relationships. The Customer class 42 is an abstract class and is not saved to the database. In this context "abstract" means that no objects of this class are ever instantiated, the class serves as a common base class for further specialization. The Customer class contains the attributes and functionality common to all customer types. The Customer class contains a customer identifier and references to related classes. The particular scenario discussed here contains two specialized subclasses of the Customer class 42, although others are possible. These are the ResidentialCustomer class 44 and the BusinessCustomer class 46. These subclasses are saved as persistent objects into the database, and add functionality and attributes to the Customer base class 40. The ResidentialCustomer class 44 adds an attribute for a residential customer's last name. The BusinessCustomer class 46 adds an attribute for a business customer's company name. The abstract Customer class 42 has relationships to two classes. A one-to-one relationship to an Address object 48 that contains an attribute for the street name and a zero-to-many relationship to the Account class 50 that contains an account identifier where m can be zero to an arbitrary large number.

The database operation of storing and retrieving Customer objects 42 and the related Address 48 and Account objects 50 needs to be as fast as possible. For this example, it is assumed that on average a Customer object 42 does not have more than two associated Account objects 50, but the case where more than two Accounts 50 exist for a Customer 42 cannot be ruled out.

Figure 3:
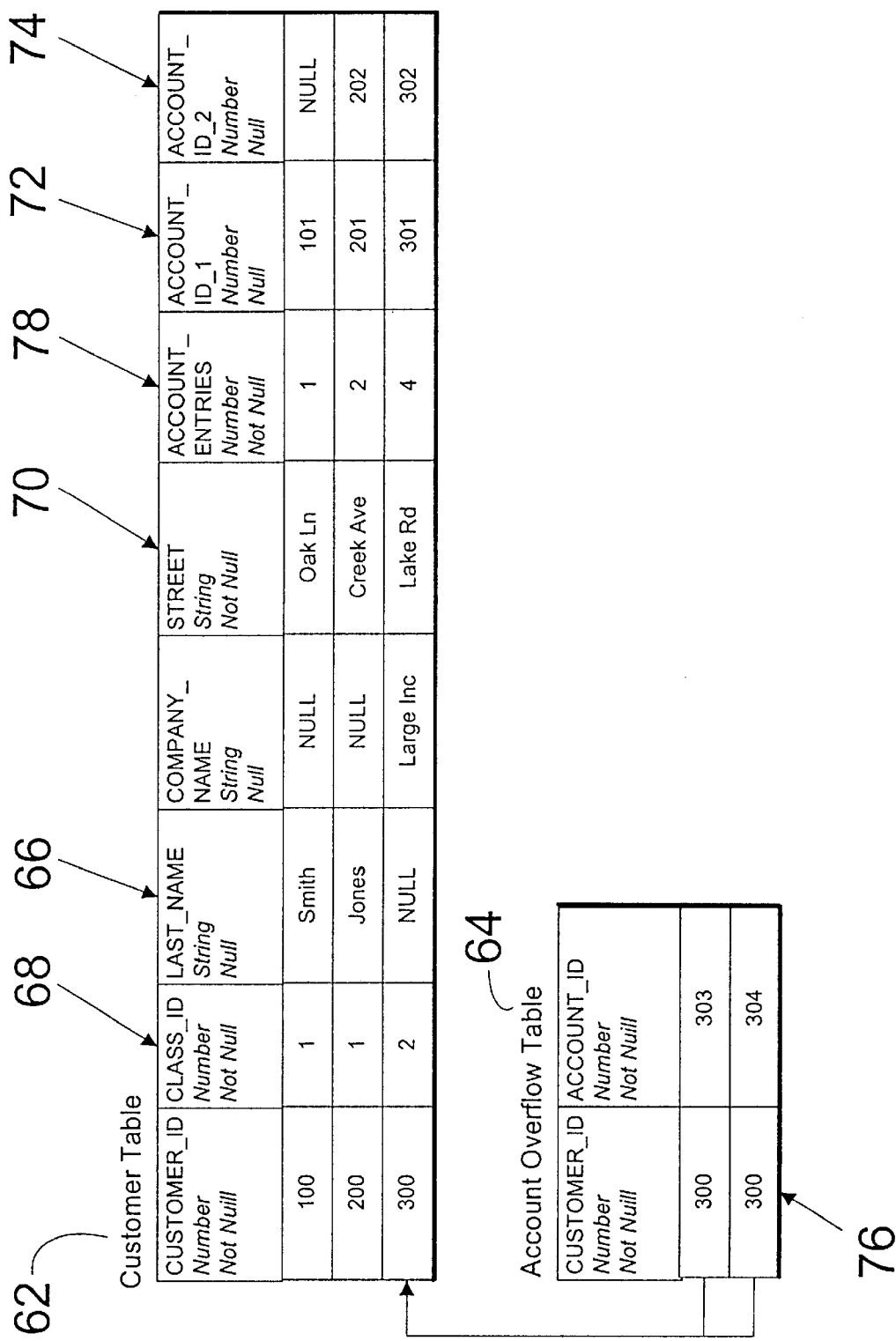
FIG. 3 depicts an example table layout.

FIG. 3 depicts the database layout chosen to store the persistent objects described above. The database layout has been designed to meet the given performance requirements. It has been optimized so that in most cases only a single database table needs to be accessed. The database layout contains two tables the Customer table 62 and the AccountOverflow table 64. The Customer table 62 is the main table and stores combined customer, address and account data. The Customer subclasses, ResidentialCustomer 44 and BusinessCustomer 46, are both mapped to the Customer table 62. The columns that are not applicable for an object of a specific subclass are left blank (NULL). For example, the LAST_NAME column 66 is not applicable for objects of the BusinessCustomer class 46 and is not populated. The CLASS_ID column 68 contains the class identifier of the object stored in the database row. The class identifier is needed to distinguish between ResidentialCustomer and BusinessCustomer objects when reading a row from the database. The address object associated with the Customer object is stored in the STREET column 70. The Customer table 62 provides storage 72 and 74 for two account objects. If a customer object is associated with more than two account objects, the remaining account objects are stored in the AccountOverflow table 64. The AccountOverflow table 64 contains a foreign key column (CUSTOMER_ID-76) used to link the accounts stored in the overflow table 64 to the customer object stored in table 62. The Customer table 62 contains a column 78 capturing how many accounts are associated a customer object. This column 78 can be used to determine whether overflow objects need to be retrieved for a Customer object.

The tables in FIG. 3 have been populated with example data. The data set contains includes two ResidentialCustomer objects and one BusinessCustomer object.

The Customer object with the identifier 100 is a ResidentialCustomer object as indicated by a CLASS_ID of 1. The object has one associated Account object with the identifier of 101. The associated Account object is stored in the Customer table. The column providing storage for a potential second Account is left empty (NULL). All storage and retrieval operations for Customer 100 with it's associated Address and Account objects can take place by accessing one single database row.

The Customer object with the identifier 200 is a ResidentialCustomer object as indicated by the CLASS_ID of 1. The object has two associated Account objects, 201 and 202. The associated Accounts' data is stored in the database row of the customer object. All storage and retrieval operations for Customer 200 with it's associated objects can take place by accessing a single database row.

The Customer object with the identifier 300 is a BusinessCustomer object as indicated by the CLASS_ID of 2. The Customer object has four associated Account objects as indicated by the ACCOUNT_ENTRIES column 78. The identifiers of the associated accounts are 301, 302, 303 and 304. The first two associated Account objects (301, 302) are stored in the database row of Customer object 300. The two remaining Account objects (303, 304) are stored in the Account overflow table 64 and linked to the Customer object 300 using a foreign key relationship. A process retrieving Customer object 300 is informed, by a count greater than two (in this case 4), that more associated objects have to be retrieved from the Account overflow table 64.

The mapping of all object attributes is described in a meta-data or mapping file and allows configuring the mapping at run-time without modifying C++ source code. The mapping information for this example includes six mapping files as depicted in FIGS. 4A–4F.

FIG. 4A illustrates an example of the table information file for the Customer table 62. Line 01 specifies the table name. Line 02 specifies the buffer size to be used for IO performed on this table. Lines 04, 05 list the mapping files applicable to this table. These are the mapping file for the ResidentialCustomer and BusinessCustomer classes. The Customer class is not listed since the class is abstract and no Customer objects exist.

FIG. 4B depicts the mapping file for the ResidentialCustomer class. Line 01 specifies the Customer mapping file to be used as the parent mapping file. This includes all mapping defined for the Customer class to the ResidentialCustomer class. Line 03 defines the mapping of the LastName attribute of the object to the LAST_NAME database column. It is further specified that the data type is string, that the field length is twenty and that the field can be NULL.

FIG. 4C show the mapping file for the BusinessCustomer class. Line 01 specifies the Customer mapping file to be used as the parent mapping file. This includes all mapping defined for the Customer class to the BusinessCustomer class. Line 03 defines the mapping of the CompanyName attribute to the COMPANY_NAME database column. It is further specified that the data type is string, that the field length is twenty and that the field can be NULL.

FIG. 4D illustrates the mapping file for the Customer class and is reused by the ResidentialCustomer and BusinessCustomer mapping files. Line 01 defines the mapping of the CustomerID attribute of the object to the CUSTOMER_ID database column. It is further specified that the data type is integer, that the field length is ten and that the field cannot be NULL. Line 02 defines that the CustomerID attribute mapped on line 01 is used as a foreign key in the ACCOUNT_OVERFLOW table in column CUSTOMER_ID. Line 03 specifies the Address attribute is a contained object and that the attribute mapping is defined in this mapping file. Line 04 defines the mapping of the Street attribute of the Address object to the STREET database column. It is further specified that the data type is string, that the field length is thirty and that the field cannot be NULL. Line 05 indicates that no further attributes of the Address object are mapped. Line 06 defines that the AccountList attribute is a list and the number of entries in the list is stored in the ACCOUNT_ENTRIES column. It is further defined that the field length is four and that the number of entries cannot be NULL. Line 07 specifies that the AccountOverflowTable.inf table information file should be used to map any overflow objects. Line 08 specifies that the list entries that are stored in the Customer table are going to be defined. Line 09 specifies that the list entries are expected to be of type Account and the attribute mapping is defined in this file. Line 10 defines the mapping of the first list entry's AccountID attribute to the ACCOUNT_ID_1 database column. It is further specified that the data type is integer, that the field length is ten. Line 11 indicates that no more attributes are being mapped for the first list entry. Lines 12 through 14 repeat the same mapping for the second list entry.

FIG. 4E shows the table information file for the AccountOverflow table 62, referred to by the Customer mapping file. Line 01 specifies the table name. Line 02 specifies the buffer size to be used for IO performed on this table. Line 04 lists the mapping files applicable to this table. In this case the Account mapping file.

FIG. 4F depicts the mapping file for the Account class. Line 01 defines the mapping of the AccountID attribute to the ACCOUNT_ID database column. It is further specified that the data type is integer, that the field length is ten and that the field cannot be NULL.

FIG. 5 depicts the node structure created when the mapping files of this example are parsed. The TableManager object 100 for the CUSTOMER table refers or points to a MappingInformation object 102 that contains information about buffering and the SQL statement used to access the database for the database table. The MappingInformation object 102 further contains a list with root node objects for all classes that are handled by the associated TableManager 100.

In this example, the MappingInformation object 102 has a pointer to the root node object 104 for the ResidentialCustomer class and to the root node object 106 for the BusinessCustomer class. During processing, the class identifier is used to determine which root node to select. The algorithm used during mapping to traverse the tree starts at node 104 for ResidentialCustomer objects and at node 106 for BusinessCustomer objects. Both root node objects 104, 106 are Primitive Nodes and refer to their corresponding CdoDbField objects 108, 110. The node object 104 provides the functionality to map from and to the LastName attribute in ResidentialCustomer objects. The associated database field object 108 provides the functionality to map to and from the buffer of the LAST_NAME column of the CUSTOMER table. The node object 106 provides the functionality to map from and to the CompanyName attribute in BusinessCustomer objects. The associated database field object 110 provides the functionality to map to and from the buffer of the COMPANY_NAME column of the CUSTOMER table. Both root node objects 104, 106 refer the same child node object 112.

The node object 112 is the root node object of the mapping tree for the Customer class that is common to both Customer subclasses ResidentialCustomer and BusinessCustomer. The node object 112 is a Primitive Node and refers to a corresponding CdoDbField object 114. The node object 112 provides the functionality to map from and to the CustomerID attribute in Customer objects. The associated database field object 114 provides the functionality to map to and from the buffer of the CUSTOMER_ID column of the CUSTOMER table.

The next child node is a Object Node 116 that contains the mapping information for the Address object contained in the Customer object. The node object 116 refers to a sub-node object 118 that provides the mapping information for an attribute contained in the Address object. The node object 118 is a primitive node and refers to a corresponding CdoDbField object 120. The node object 118 provides the functionality to map from and to the Street attribute in Address objects. The associated database field object 120 provides the functionality to map to and from the buffer of the STREET column of the CUSTOMER table.

The next child node to be processed is the List Node object 122 representing the list of Account objects contained in the Customer object. The first sub-node object 124 maps the number of object contained in the list to the database. The node object 124 is a Primitive Node and refers to a corresponding CdoDbField object 126. The node object 124 provides the functionality to map from and to the number of entries in the list of accounts. The associated database field object 126 provides the functionality to map to and from the buffer of the ACCOUNT_ENTRIES column of the CUSTOMER table. The List Node object further contains two sub-node objects 128, 130 that represent the list entries being stored in the CUSTOMER table. Each node representing a list entry is an Object Node. The Object Nodes in this case contain each Primitive Node object 132, 134 that is linked to a corresponding CdoDbField object 136, 138. The node objects 132, 134 provides the functionality to map from and to the AccountID attribute in Account objects. The associated database field objects 136, 138 provides the functionality to map to and from the buffer of the ACCOUNT_ID_1 respectively ACCOUNT_ID_2 column of the CUSTOMER table. The List Node object 122 also contains a reference to TableManager object 140 for the ACCOUNT_OVERFLOW table. This part of the tree is traversed for any overflow objects that exist in the list of Account objects. The TableManager object 140 for the ACCOUNT_OVERFLOW table refers to a MappingInformation object 142 that contains information about buffering and the SQL statement for the database table. The MappingInformation further contains a list with root node objects for all classes that are handled by the associated TableManager 140. In this example the MappingInformation object 142 only contains a pointer to the root node object 144 for the Account class.

The node object 144 is a Key Node representing the foreign key relationship to the Customer object. The Key Node contains a sub-node object 146. The node object 146 is a Primitive Node and has an associated CdoDbField object 148. The node object 146 provides the functionality to map from and to the CustomerID attribute in Customer objects. The associated database field object 148 provides the functionality to map from the buffer of the CUSTOMER_ID column of the ACCOUNT_OVERFLOW table. The last node object 150 to be processed is a Primitive Node and refers to a corresponding CdoDbField object. The node object 150 provides the functionality to map from and to the AccountID attribute in Account objects. The associated database field object 152 provides the functionality to map to and from the buffer of the ACCOUNT_ID column of the ACCOUNT_OVERFLOW table.

A detailed understanding of the business objects and database design is required if one is to gain all the benefits offered by ORDMI. The business objects and the database layout need to be clearly defined before the mapping mechanism provided by ORDMI can be applied. An appropriate database layout is crucial if one is to achieve the performance aimed for. This requires experience and judgement. Once the objects have been coded and the database tables have been setup, the mapping files such as described herein, are created. The mapping files specify the mapping between objects and the database tables. The ORDMI reads the information contained in the mapping files at initialization time. The ORDMI is now ready to be used by the application. If the business process creates new object instances, these instances can be saved or mapped to the database using ORDMI, which will be described in more detail with respect to FIG. 6. If an objects exists in the database (having been stored previously), the object can be retrieved from the database using ORDMI as required by the business process and which will be described in more detail with respect to FIG. 7.

Figure 6:
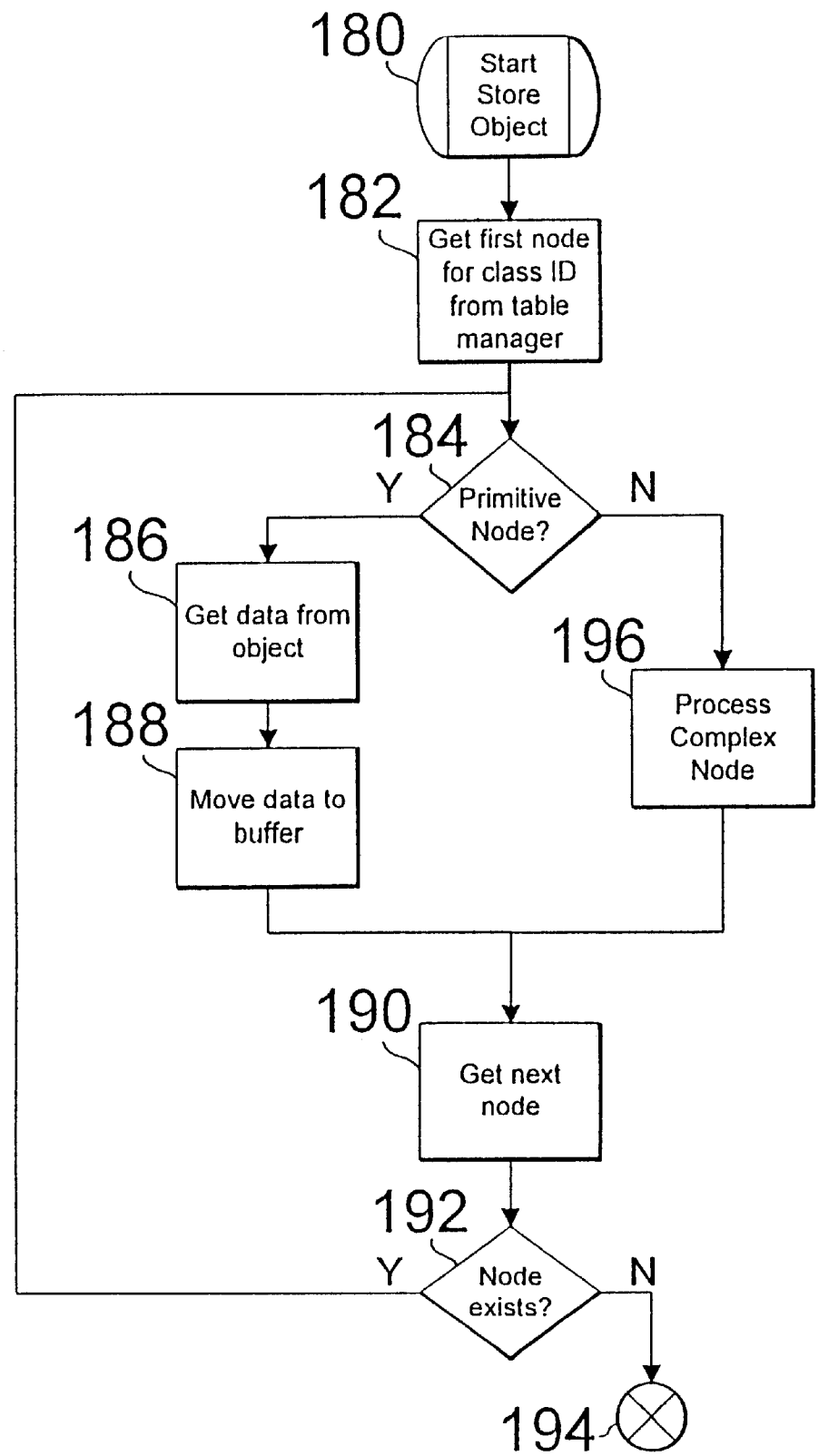
FIG. 6 depicts a process of mapping from an object to a database.

In mapping objects to the database schema, the process, as depicted in FIG. 6, once started 180, first retrieves 182 the root node of the mapping tree from the TableManager object. To retrieve the root node, the TableManager is provided with the class identifier of the object to be mapped. The object to be mapped is now handed to the node to perform the data mapping from object to the buffer area. The functionality of how or method by which a node is processed is contained in each node itself and functions as a recursive algorithm. The next process operation is to determine 184 whether the current node is a Primitive Node or a Complex Node. If the node is a Primitive Node, the process extracts 186 the data from the object using the reflection layer. The extracted data is then moved 188 to a buffer area using the database field object associated to the node object. The data is not written to the database unless the buffer is filled or the process requests a flush of the cache. This effectively buffers the database write operations and increases performance. The next operation is to retrieve 190 the next node. How the next node is retrieved depends on the node type. For complex nodes the sub-nodes are processed first, for nodes without sub-nodes the child node is processed next. If 192 a next node exists, the process continues to process the next node. If no additional nodes exist, the process exits 194. The processing 196 of complex nodes depends on the type of complex node encountered.

An object node (see 116 of FIG. 5) can either map an object to the same table as the object containing the object or to a different table. If the object is stored in the same table the object contains sub-nodes (primitive or complex) that perform the mapping. The sub-nodes are processed for the contained object in a loop that can contain recursive processing as shown in FIG. 6 between 184 and 192. If the object is stored in a different table, the node contains a reference to the TableManager object. In this case, the process executes a mapping process starting at 180 as depicted in FIG. 6 for the contained object.

A pointer node works essentially like an object node. The only difference is that the pointer node first verifies whether the object pointer is NULL and, as a consequence, does not refer to an object. If the pointer does not refer to an object, the indicator column is set to indicate that no associated object exists and no object is processed. If the pointer refers to an object, the indicator column is set to indicate that an associated object exists and the object is processed as described above for the object node.

A list node (see 122 of FIG. 5) contains primitive nodes that perform the mapping for the number of list entries contained. The list node also contains object nodes for the entries that are stored in the same table as the object contained in the row. The object nodes are processed as described above. For the overflow objects, the list node contains a reference to a TableManager object. For each overflow object the mapping process, as depicted in FIG. 6, is executed.

A key node (see 144 of FIG. 5) needs to be provided with a reference to the object where the information to set up the foreign key relationship is contained. The key node contains sub-nodes that perform the mapping of the data elements.

In mapping a row from the database to objects in memory, the process as depicted in FIG. 7, once started 200, first executes 202 a conventional SQL select statement on the table. The data returned by the query is stored in a buffer area. Depending on the SQL statement and the database content, the query can return zero, one or many rows. If the query returns many rows, the data is retrieved until the buffer has been filled or the query has finished returning data. Once the data is retrieved, the process creates 204 an object according to the class identifier. The class identifier (see 68 in FIG. 3) is taken from the retrieved row if multiple classes are stored in the same table. The process then retrieves 206 the first node of the mapping tree from the TableManager object. The TableManager is provided with the class identifier to retrieve the corresponding node object. The empty object is now handed to the node to perform the data mapping from the buffer area to the object. The functionality or how a node is processed is contained in each node itself and functions as a recursive algorithm. The next process operation 208 is to determine whether the current node is a Primitive Node or a Complex Node. If the node is a Primitive Node, the process gets the data from the buffer area using the database field object. The data is then set 212 on the object using the reflection layer. The next step is to retrieve 214 the next node. How the next node is retrieved depends on the node type. For complex nodes the sub-nodes are processed next, for nodes without sub-nodes the child node is processed next. If 216 a next node exists, the process continues to process the next node. If no additional nodes, the process exits 218. The processing 220 of complex nodes depends on the type of complex node encountered.

An object node can either map an object to the same table as the object containing the object or a different table. If the object is stored in the same table, the sub-nodes (primitive or complex) are processed in a loop that can contain recursive processing as shown in FIG. 7 between 208 and 216. If the object is stored in a different table, the node contains a reference to the TableManager object. The process then executes a mapping process as depicted in FIG. 7 for the contained object.

For a pointer node, it is first verified whether the indicator column indicates whether an associated object exist or not. If no object exists the pointer on the object is set to NULL. If an associated object exists, a new object is created according to the class identified found on the database row or specified in the mapping information. The data for the allocated object is then mapped as described for object nodes above.

For a list node, the row indicating how many objects are contained in the list is analyzed first. The process then allocates as many objects as indicated and adds the object to the list. For objects in the list being stored in the same table, the objects are mapped using the algorithm for object nodes. For all overflow objects, the reference to the TableManager object is used to execute the mapping process as depicted in FIG. 7.

Key node information is used to preserve object relationships in the database and does not need to be mapped to the objects.

The many features and advantages of the invention are apparent from the detailed specification and, thus, it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. An apparatus, comprising:
a relational database system storing object data for objects and an association of the objects in relational database tables; and
an application system dynamically mapping, at run-time, the data between the objects and the database tables using mapping files comprising a mapping tree and having a reflection layer allowing dynamic mapping, at run-time, of attributes and methods using names.

2. An apparatus as recited in claim 1, wherein said database system includes an overflow table linked to the database table.

3. An apparatus as recited in claim 1, wherein said reflection layer comprises a C++ reflection layer.

4. An apparatus as recited in claim 1, wherein said application system buffers the data being mapped to and from the database table.

5. A customer care and billing apparatus, comprising:
a relational database system storing object data for customer objects and an association of the objects in relational database tables and including overflow tables linked to the database tables; and
an application system dynamically mapping, at run-time, the data between the objects and the database tables using mapping files comprising a mapping tree, having a C++ reflection layer allowing dynamic mapping, at run-time, of attributes and methods using names and having buffers buffering the data being mapped to and from the database table.

6. A process, comprising:
providing a mapping for mapping data between an object and a relational database table; and
dynamically mapping, at run-time, the data between and an object and the database table using mapping file comprising a mapping tree by resolving attributes names and method names using a reflection layer.

7. A process as recited in claim 6, wherein said mapping mappings to an overflow table when an object is associated with more than a predetermined number of other objects.

8. A process as recited in claim 6, wherein said mapping resolves attributes names and method names using a C++ reflection layer.

9. A process as recited in claim 6, wherein said mapping includes buffering data being mapped to and from the database table.

10. A computer readable storage medium storing a process controlling a computer by dynamically mapping, at run-time, object data between and objects and relational database tables using mapping files comprising a mapping tree by resolving attributes names and method names using a reflection layer.

* * * * *

UNITED STATES PATENT AND TRADEMARK OFFICE
CERTIFICATE OF CORRECTION

PATENT NO. : 6,240,422 B1  
DATED : May 29, 2001  
INVENTOR(S) : Stephan Atkins et al.

It is certified that error appears in the above-identified patent and that said Letters Patent is hereby corrected as shown below:

<u>Title page,</u>
Item [75], change "Schmetz" to -- Schmelz --.

Signed and Sealed this

Fifteenth Day of January, 2002

Attest:

JAMES E. ROGAN
*Director of the United States Patent and Trademark Office*

*Attesting Officer*